United States Patent [19]

Kado et al.

[11] Patent Number: 5,506,295
[45] Date of Patent: Apr. 9, 1996

[54] INK

[75] Inventors: Seiji Kado; Hiromi Kosaka; Masayuki Ishii, all of Osaka, Japan

[73] Assignee: Mita Industrial Co., Ltd., Osaka, Japan

[21] Appl. No.: 382,528

[22] Filed: Feb. 2, 1995

[30] Foreign Application Priority Data

Mar. 7, 1994 [JP] Japan ................ 6-036086

[51] Int. Cl.$^6$ ............ C09D 11/00; C09D 11/16
[52] U.S. Cl. ............ 524/548; 524/547; 524/555; 526/260; 526/287; 523/160; 523/161; 106/20 D
[58] Field of Search ............ 524/548, 547, 524/555; 526/260, 287; 523/160, 161; 106/20 D

[56] References Cited

U.S. PATENT DOCUMENTS

| | | | |
|---|---|---|---|
| 4,623,689 | 11/1986 | Shintani et al. | 524/457 |
| 4,740,549 | 4/1988 | Okuzono et al. | 524/547 |

*Primary Examiner*—Paul R. Michl
*Assistant Examiner*—Olga Asinovsky
*Attorney, Agent, or Firm*—Beveridge, DeGrandi, Weilacher & Young

[57] ABSTRACT

Ink comprising an aqueous medium, a water-insoluble colorant and a dispersant for dispersing the colorant in the aqueous medium, the dispersant being a water-soluble polymer obtained by polymerizing a monomer containing at least one monomer selected from acryloylmorpholine represented by the formula (1):

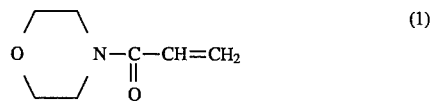

(1)

and styrene sulfonate represented by the formula (2):

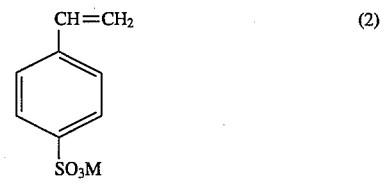

(2)

[wherein M is an alkaline metal atom or an amino group] is provided. This ink is suitable for using for an ink-jet recording system because it provides a fast recorded image and is also superior in storage stability and jetting stability.

16 Claims, No Drawings

INK

BACKGROUND OF THE INVENTION

The present invention relates to aqueous ink. More particularly, it relates to ink suitable for ink-jet recording system.

Heretofore, in the ink-jet recording system, there has been used ink obtained by dissolving a water-soluble dye in water or a mixed solution of water and a water-soluble organic solvent (hereinafter referred to as an "aqueous medium", generically). However, since the water-soluble dye is essentially inferior in water resistance and light resistance, a fastness of a recorded image sometimes become a problem.

Therefore, in order to use a water-insoluble colorant which is superior in fastness, particularly water and light resistances, such as pigment (e.g. carbon black, etc.), water-insoluble dye (e.g. disperse dye, oil-soluble dye, etc.) and the like in place of the water-soluble dye, various dispersants have been studied so as to disperse the waterinsoluble colorant stably in the aqueous medium.

However, regarding a conventional dispersant, it is difficult to disperse the water-insoluble colorant stably in the aqueous medium. Particularly, there was a problem that the colorant is aggregated at the time of storing ink for a long period of time or it becomes impossible to jet ink stably because an orifice (e.g. nozzle, etc.) of an ink-jet printer is clogged with ink.

SUMMARY OF THE INVENTION

It is a main object of the present invention to provide ink which can form a recorded image having an excellent fastness such as water resistance, light resistance, etc. and is also superior in storage stability and jetting stability.

Ink of the present invention comprises an aqueous medium, a water-insoluble colorant and a dispersant for dispersing the colorant in the aqueous medium, the dispersant being a water-soluble polymer obtained by polymerizing at least one monomer selected from acryloylmorpholine represented by the formula (1):

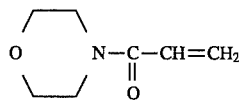  (1)

and styrene sulfonate represented by the formula (2):

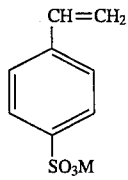  (2)

wherein M is an alkaline metal atom or an amino group].

It is preferred that the water-soluble polymer is a copolymer obtained by copolymerizing at least one monomer selected from acryloylmorpholine represented by the formula (1) and styrene sulfonate represented by the formula (2) with at least one monomer selected from a lower fatty acid vinyl ester represented by the formula (3):

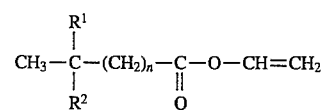

wherein n is an integer of 0 to 15, and $R^1$ and $R^2$ are the same or different and indicate a hydrogen atom or a methyl group] and styrene.

Further, as the water-insoluble colorant, it is preferred to use a pigment in combination with a water-insoluble dye such as disperse dye, oil-soluble dye, etc.

According to the present invention, the dispersion stability of the water-insoluble colorant in the aqueous medium is improved by the action of the dispersant of the water-soluble polymer obtained by polymerizing a monomer containing at least one monomer selected from acryloylmorpholine represented by the formula (1) and styrene sulfonate represented by the formula (2). As a result, it becomes possible that ink of the present invention has a storage stability and jetting stability which are equal to those of the water-soluble dye even if the water-insoluble colorant is used, thereby contributing to the improvement of the fastness of the recorded image in the ink-jet printer.

Further, when using the water-soluble polymer obtained by copolymerizing at least one monomer selected from the above two kinds of monomers (1) and (2) with at least one monomer selected from a lower fatty acid vinyl ester represented by the formula (3) and styrene as the dispersant, there are advantages that the dispersion properties of the colorant are further improved and the fixing properties of the recorded image onto a paper are also improved.

Furthermore, when using the combination of the pigment and water-insoluble dye as the water-insoluble colorant, the image density of the recorded image can be enhanced in comparison with the case that any one is used alone.

DETAILED DESCRIPTION OF THE INVENTION

The aqueous medium used in the present invention means water or a mixed solution of water and a water-soluble organic solvent, as is similar to the prior art. Non-limited examples of the water-soluble organic solvent to be mixed with water include lower alcohols such as methanol, ethanol, propanol, etc.; amides such as dimethylformamide, dimethylacetamide, etc.; ketones or ketone alcohols such as acetone, diacetone alcohol, etc.; ethers such as tetrahydrofuran, dioxane, etc.; N-methyl-2-pyrrolidone, 1,3-dimethyl-2-imidazolidinone, etc.

These organic solvents act as an evaporation adjustor which assists the evaporation of ink printed on the paper to adjust it's evaporation rate.

the amount of the organic solvent is preferably not more than 30% by weight, particularly about 5 to 20% by weight for water so as to maintain characteristics as the aqueous medium.

Examples of the water-insoluble colorant include pigment, oil-soluble dye, disperse dye and the like.

As the pigment, there can be used various inorganic or organic pigments. Particularly, in case of black ink, various pigments such as carbon black, lamp black, diamond black, etc. can be suitably used. Further, examples of the oil-soluble dye and disperse dye include dyes having a structure of azo, anthraquinone, quinophthalone, indigo, phthalocyanine, dioxane, nitro and the like.

The amount of the colorant is not specifically limited and is preferably about 1 to 15% by weight, particularly about 3 to 10% by weight, based on the total amount of ink. Further, when using the oil-soluble dye or disperse dye alone, the amount is preferably 1 to 10% by weight, particularly about 5% by weight, based on the total amount of ink.

When the amount of the colorant is smaller than the lower limit of the respective ranges, the tinting strength of ink is insufficient and the image density of the recorded image is likely to be insufficient. To the contrary, when the amount of the colorant exceeds the upper limit of the respective ranges, it is likely to be difficult to disperse it uniformly in ink, even if the construction of the present invention is satisfied.

Further, when using the pigment in combination with the oil-soluble dye, the amount of the pigment is preferably within the above range and that of the oil-soluble dye is preferably 0.05 to 4% by weight, particularly about 1% by weight, based on the total amount of ink. When the amount of the oil-soluble dye is smaller than the above range, it is likely to fail to obtain a sufficient effect due to the addition of the oil-soluble dye. To the contrary, when the amount exceeds the above range, it is likely to be difficult to disperse it uniformly in ink.

As the dispersant for dispersing the colorant in the aqueous medium, there can be used a water-soluble polymer obtained by polymerizing a monomer containing at least one monomer selected from acryloylmorpholine represented by the formula (1) and styrene sulfonate represented by the formula (2).

Examples of the styrene sulfonate represented by the formula (2) include sodium styrene sulfonate represented by the formula (2a):

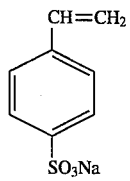

(2a)

The water-soluble polymer can be formed by polymerizing one monomer of the above two kinds of monomers alone or copolymerizing both monomers, or copolymerizing at least one monomer of two kinds of monomers with the other monomer.

As the other monomer to be copolymerized with at least one monomer of the above two kinds of monomers, there can be used various monomers which have hitherto been known. Particularly, a lower fatty acid vinyl ester represented by the formula (3) or styrene is preferred.

As the lower fatty acid vinyl ester represented by the formula (3), those in which n is 0 to 3 are preferred. Examples of the lower fatty acid vinyl ester include vinyl 5 pivalate represented by the formula (3a):

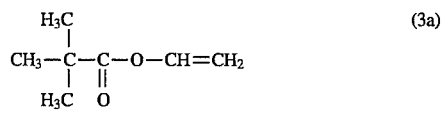

(3a)

When the other monomer is copolymerized, the amount is not specifically limited and is preferably 20 to 80% by weight, particularly about 35 to 65% by weight, based on the total amount of monomers.

When the amount of the other monomer is smaller than the above range, the addition effect is not sufficiently obtained. To the contrary, when the amount of the other monomer exceeds the above range, the amount of monomers represented by the formulas (1) and (2) is decreased relatively and the water-solubility of the polymer is likely to be deteriorated.

The polymerization degree of the water-soluble polymer composed of the above respective monomers is not specifically limited but the viscosity of ink is increased when the polymerization degree is too high. Therefore, the polymerization degree of the water-soluble polymer is preferably 99 or less, particularly about 20 to 70.

The amount of the water-soluble polymer is not specifically limited and is preferably 0.1 to 10% by weight, particularly about 0.3 to 5% by weight, based on the total amount of ink.

When the amount of the water-soluble polymer is smaller than the above range, the addition effect is not sufficiently obtained and the dispersion properties of the colorant are deteriorated. Therefore, the storage stability and jetting stability of ink are likely to be deteriorated. To the contrary, when the amount of the water-soluble polymer exceeds the above range, the viscosity of ink is likely to be increased.

To ink comprising the above respective components of the present invention, if necessary, there can be formulated various additives which have hitherto been known in a suitable amount., Non-limited examples of the additive include viscosity adjustor for suppressing the evaporation of water in ink and adjusting the viscosity of ink, pH adjustor for adjusting pH of ink and the like. Examples of the viscosity adjustor include glycerin, diethylene glycol and the like, and examples of the pH adjustor include monoethanolamine, diethylamine and the like. Further, when using the oil-soluble dye or disperse dye as the colorant, ultraviolet absorbers, antioxidants, etc. may be added as an additive for these dyes.

Ink comprising the above respective components of the present invention can be produced by a method which is similar to a conventional method, comprising adding a colorant to an aqueous solution of a dispersant, subjecting the mixed solution to a dispersion treatment using a dispersing means such as ball mill, etc. and, if necessary, after subjecting to a centrifugation treatment, adding an additive to the dispersion and then diluting with an aqueous medium so that a predetermined concentration may be obtained. When a small amount of ink is produced, a predetermined amount of the aqueous medium and additives may be added to a dispersion system in advance and subjected to a dispersion treatment without additional dilution or formulation of additives.

Further, when using the oil-soluble dye as the colorant (including both cases that the dye is used alone or in combination with the pigment) and using the water-soluble polymer obtained by copolymerizing at least one monomer selected from acryloylmorpholine represented by the formula (1) and styrene sulfonate represented by the formula (2) with at least one monomer selected from the lower fatty acid vinyl ester represented by the formula (3) and styrene as the dispersant, it is preferred to produce ink by the following method.

Firstly, the oil-soluble dye and, if necessary, additives such as ultraviolet absorbers, antioxidants, etc. are dissolved in the lower fatty acid vinyl ester represented by the formula (3) or styrene among the respective monomers constituting the water-soluble polymer to prepare an oil phase component.

On the other hand, acryloylmorpholine represented by the formula (1) or styrene sulfonate represented by the formula (2) is dissolved in a predetermined amount of the aqueous medium, to which are added the above oil phase component and a polymerization initiator and the mixture is polymerized with stirring to prepare a dispersion.

Then, a pigment is added to this dispersion in case of a system (in combination with the pigment) and, if necessary, after formulating additives such as viscosity adjustors, pH adjustors, etc., if necessary, subjecting the mixture to a dispersion treatment using a dispersion means such as ball mil, etc. to prepare ink.

According to this method, the dispersion properties of the oil-soluble dye can be further improved in comparison with the case of the post-addition, thereby improving the tint of ink.

As described above, according to the present invention, the dispersion stability of the water-insoluble colorant in the aqueous medium can be improved by the action of the dispersant of the water-soluble polymer obtained by polymerizing a specific monomer. Accordingly, ink of the present invention provides a recorded image having an excellent fastness such as water resistance, light resistance, etc. because the water-insoluble colorant is used and has a storage stability and jetting stability which are equal to those of the water-soluble dye and, therefore, it is suitable as ink for ink-jet printer.

Further, ink of the present invention can also be applied to ink used for other recording systems other than the ink-jet recording system.

EXAMPLE

The following Examples and Comparative Examples further illustrate the present invention in detail but are not to be construed to limit the scope thereof.

EXAMPLE 1

3 G of sodium styrene sulfonate, 3 g of vinyl pivalate and 0.3 g of 2,2-azobis(2-aminopropyl)dihydrochloride were added in 250 g of pure water and the polymerization reaction was conducted with stirring at 80° C for 5 hours to give an aqueous solution of a water-soluble polymer (concentration of water-soluble polymer as solid content: 1.6% by weight, polymerization degree of water-soluble polymer: 30).

Then, to 31.5 g of this aqueous solution, 1.5 g of carbon black, 10 g of diethylene glycol as a viscosity adjustor, 5 g of ethanol as an evaporation adjustor and 2 g of monoethanolamine as a pH adjustor were added, followed by mixing with stirring using a ball mill for 5 hours to give ink.

EXAMPLE 2

8 G of sodium styrene sulfonate and 0.5 g of 2,2-azobis(2-aminopropyl)dihydrochloride were added in 250 g of pure water and the polymerization reaction was conducted with stirring at 80° C. for 5 hours to give an aqueous solution of a water-soluble polymer (concentration of water-soluble polymer as solid content: 2.3% by weight, polymerization degree of water-soluble polymer: 45).

Then, to 30 g of this aqueous solution, 2 g of carbon black, 5 g of diethylene glycol as a viscosity adjustor, 10 g of 2-propanol as an evaporation adjustor and 3 g of monoethanolamine as a pH adjustor were added, followed by mixing with stirring using a ball mill for 5 hours to give ink.

EXAMPLE 3

4 G of sodium styrene sulfonate, 2.5 g of styrene and 0.5 g of 2,2-azobis(2-aminopropyl)dihydrochloride were added in 250 g of pure water and the polymerization reaction was conducted with stirring at 80° C. for 5 hours to give an aqueous solution of a water-soluble polymer (concentration of water-soluble polymer as solid content: 1.9% by weight, polymerization degree of water-soluble polymer: 51). Then, according to the same manner as that described in Example 2 except for using 30 g of this aqueous solution, ink was obtained.

EXAMPLE 4

2 G of acryloylmorpholine, 1 g of styrene and 0.5 g of 2,2-azobis(2-aminopropyl)dihydrochloride were added in 200 g of pure water and the polymerization reaction was conducted with stirring at 80° C. for 5 hours to give an aqueous solution of a water-soluble polymer (concentration of water-soluble polymer as solid content: 1.1% by weight, polymerization degree of water-soluble polymer: 33). Then, according to the same manner as that described in Example 2 except for using 31.5 g of this aqueous solution, ink was obtained.

EXAMPLE 5

5 G of acryloylmorpholine, 3 g of vinyl pivalate and 0.5 g of 2,2-azobis(2-aminopropyl)dihydrochloride were added in 250 g of pure water and the polymerization reaction was conducted with stirring at 80° C. for 5 hours to give an aqueous solution of a water-soluble polymer (concentration of water-soluble polymer as solid content: 1.6% by weight, polymerization degree of water-soluble polymer: 60). Then, according to the same manner as that described in Example 1 except for using 31.5 g of this aqueous solution, ink was obtained.

EXAMPLE 6

8 G of acryloylmorpholine and 0.5 g of 2,2-azobis(2-aminopropyl)dihydrochloride were added in 250 g of pure water and the polymerization reaction was conducted with stirring at 80° C for 5 hours to give an aqueous solution of a water-soluble polymer (concentration of water-soluble polymer as solid content: 2.0% by weight, polymerization degree of water-soluble polymer: 68). Then, according to the same manner as that described in Example 2 except for using 30.0 g of this aqueous solution, ink was obtained.

EXAMPLE 7

0.3 G of an oil-soluble dye [TON109 (trade name), manufactured by Mitsui Toatsu Senryo Co., Ltd.] was dissolved in 5 g of styrene to prepare an oil phase component. A total amount of this oil phase component, 8 g of acryloylmorpholine and 0.5 g of 2,2-azobis(2-aminopropyl)dihydrochloride were added in 150 g of pure water and the polymerization reaction was conducted with stirring at 80° C. for 5 hours to give a dispersion in which a water-soluble polymer is dissolved and an oil-soluble dye is dispersed (concentration of water-soluble polymer as solid content: 6.7% by weight, polymerization degree of water-soluble polymer: 30).

Then, to 23.5 g of this dispersion, 1.5 g of carbon black, 10 g of glycerin as a viscosity adjustor, 10 g of ethanol as an evaporation adjustor and 5 g of diethylamine as a pH adjustor were added, followed by mixing with stirring using a ball mill for 5 hours to give ink.

EXAMPLE 8

0.3 G of an oil-soluble dye [TON109, manufactured by Mitsui Toatsu Senryo Co., Ltd.] was dissolved in 5 g of vinyl pivalate to prepare an oil phase component. According to the same manner as that described in Example 7, a total amount of this oil phase component was used to give a dispersion in which a water-soluble polymer is dissolved and an oil-soluble dye is dispersed (concentration of water-soluble polymer as solid content: 6.3% by weight, polymerization degree of water-soluble polymer: 52). Then, according to the same manner as that described in Example 7 except for using 23.5 g of this dispersion, ink was obtained.

COMPARATIVE EXAMPLE 1

According to the same manner as that described in Example 2 except for using 30 g of an aqueous 0.2% solution of sodium dodecylbenzenesulfonate as a dispersant, ink was obtained.

COMPARATIVE EXAMPLE 2

According to the same manner as that described in Example 2 except for using 30 g of an aqueous solution obtained by dissolving 1.5 g of sodium styrene sulfonate in 8.5 g of pure water in the non-polymerized state, in place of the aqueous solution of the water-soluble polymer, ink was obtained.

COMPARATIVE EXAMPLE 3

A water-soluble dye [WATER BLACK 100L (trade name), manufactured by Orient Co.] was dissolved in pure water to prepare an aqueous solution having a concentration of 1.5% by weight as ink.

Regarding inks obtained in the above Examples and Comparative Examples, the following tests were conducted and their characteristics were evaluated.

Dispersion properties evaluation test I

Regarding each ink, a dispersion particle size [central particle size $D_{50}$ (μm) of carbon black at the stage immediately after production was measured by means of a light scattering method and the dispersion properties were evaluated.

Dispersion properties evaluation test II

A dispersion particle size [central particle size $D_{50}$ (μm) of carbon black after standing each ink at room temperature for 60 days was measured by means of a light scattering method and the dispersion properties were evaluated.

Image density measuring test

The setting was conducted on a white paper using each ink for an ink-jet printer and the setting density was measured using a reflection densitometer (Model TC-6D, manufactured by Tokyo Denshoku Co., Ltd.).

Water resistance test

A paper subjected to the above setting was dipped in water at 20° C. and allowed to stand for 5 minutes and, after drying completely, the setting density of the same setting was measured using the above reflection densitometer and the water resistance was determined by the following equation:

Water resistance (%)=(setting density after dipping in water/initial setting density)×100

The results are shown in Table 1.

TABLE 1

| | Initial particle size (μm) | Particle size after standing (μm) | Initial setting density | Water resistance (%) |
|---|---|---|---|---|
| Example 1 | 0.256 | 0.250 | 1.362 | 100 |
| Example 2 | 0.330 | 0.308 | 1.370 | 100 |
| Example 3 | 0.334 | 0.312 | 1.361 | 100 |
| Example 4 | 0.255 | 0.279 | 1.348 | 100 |
| Example 5 | 0.394 | 0.376 | 1.352 | 100 |
| Example 6 | 0.298 | 0.310 | 1.367 | 100 |
| Example 7 | 0.255 | 0.276 | 1.581 | 100 |
| Example 8 | 0.476 | 0.488 | 1.408 | 100 |
| Com. Example 1 | 4.491 | — | 1.250 | 100 |
| Com. Example 2 | 3.276 | — | 1.263 | 100 |
| Com. Example 3 | — | — | 1.501 | 52 |

In Table 1, regarding both ink of Comparative Example 1 using sodium dodecylbenzenesulfonate and ink of Comparative Example 2 using non-polymerized sodium styrene sulfonate as the dispersant, the dispersion particle size of carbon black was by far larger than 1 μm, which is considered to be unsuitable for using as ink, since immediately after the production of ink it was found that the dispersion properties are inferior. Therefore, the particle size after standing for 60 days was not measured.

Further, it was found that ink of Comparative Example 3 using the water-soluble dye is superior in initial setting density but the water resistance is considerably inferior.

To the contrary, it was confirmed that all inks of Examples 1 to 8 are superior in initial dispersion properties and those after standing and are also superior in water resistance. Further, it was also found that inks of Examples 7 and 8 using carbon black as the pigment in combination with the oil-soluble dye can increase the setting density in comparison with other Examples.

EXAMPLE 9

0.3 G of an oil-soluble dye [TON109 (trade name), manufactured by Mitsui Toatsu Senryo Co., Ltd.] was dissolved in 5 g of vinyl pivalate to prepare an oil phase component. A total amount of this oil phase component, 8 g of acryloylmorpholine represented by the formula (1) and 0.5 g of 2,2-azobis(2-aminopropyl)dihydrochloride were added in 150 g of pure water and the polymerization reaction was conducted with stirring at 80° C. for 5 hours to give a dispersion in which a water-soluble polymer is dissolved and an oil-soluble dye is dispersed (concentration of water-soluble polymer as solid content: 5.8% by weight, polymerization degree of water-soluble polymer: 50).

Then, to 23.5 g of this dispersion, 10 g of glycerin, 10 g of ethanol and 5 g of diethylamine were added, followed by mixing with stirring using a ball mill for 5 hours to give ink.

COMPARATIVE EXAMPLE 4

According to the same manner as that described in Example 9 except for using 23.5 g of a dispersion obtained by dissolving 0.3 g of an oil-soluble dye [TON109 (trade name), manufactured by Mitsui Toatsu Senryo Co., Ltd.] in 163.5 g of an aqueous 0.2% solution of sodium dodecylbenzenesulfonate, ink was obtained.

Regarding inks obtained in Example 9 and Comparative Example 4, the following dispersion properties evaluation test III and the above image density measuring test and water resistance test were conducted and their characteristics were determined.

Dispersion properties evaluation test III

After each ink was allowed to stand at room temperature for 60 days, it was observed visually whether the oil-soluble dye was precipitated or not.

The above results are shown in Table 2.

TABLE 2

|  | State of precipitation | Initial setting density | Water resistance (%) |
|---|---|---|---|
| Example 9 | Not precipitated | 1.309 | 100 |
| Com. Example 4 | precipitated | — | — |

In Table 2, regarding ink of Comparative Example 4 using sodium dodecylbenzenesulfonate, the precipitation of the oil-soluble dye was confirmed after standing for 60 days. It was found that the dispersion properties are inferior. Therefore, other tests were not conducted.

To the contrary, it was confirmed that ink of Example 9 is superior in dispersion properties and is also superior in water resistance.

What is claimed is:

1. Ink comprising an aqueous medium, a water-insoluble colorant including a pigment, and a dispersant for dispersing said colorant in said aqueous medium, said dispersant being a water-soluble polymer obtained by polymerizing a monomer containing at least one monomer selected from acryloylmorpholine of formula (1):

$$O \diagup\diagdown N-\underset{\underset{O}{\|}}{C}-CH=CH_2 \tag{1}$$

and styrene sulfonate of formula (2):

$$\underset{SO_3M}{\underset{\bigcirc}{CH=CH_2}} \tag{2}$$

wherein M is an alkaline metal atom or an amino group.

2. Ink according to claim 1, wherein said water-soluble polymer is a copolymer obtained by copolymerizing at least one monomer selected from acryloylmorpholine of formula (1) and styrene sulfonate of formula (2) with at least one monomer selected from a lower fatty acid vinyl ester of formula (3):

$$CH_3-\underset{R^2}{\overset{R^1}{\underset{|}{C}}}-(CH_2)_n-\underset{\underset{O}{\|}}{C}-O-CH=CH_2 \tag{3}$$

wherein n is an integer of 0 to 15, and $R^1$ and $R^2$ are the same or different and indicate a hydrogen atom or a methyl group, and styrene.

3. Ink according to claim 2, wherein an amount of at least one monomer selected from the lower fatty acid vinyl ester and styrene is 20 to 80% by weight based on the total amount of monomers.

4. Ink according to claim 1, wherein a polymerization degree of the water-soluble polymer is 99 or less.

5. Ink according to claim 1, wherein the water-soluble polymer is formulated in an amount of 0.1 to 10% by weight based on the total amount of ink.

6. Ink according to claim 1, wherein the water-insoluble colorant is composed of a pigment and a water-insoluble dye.

7. Ink according to claim 1, wherein the water-insoluble colorant is formulated in an amount of 1 to 15% by weight based on the total amount of ink.

8. Ink according to claim 1, which is used for an ink-jet recording system.

9. Ink according to claim 1, wherein said water-soluble polymer is obtained by polymerizing a monomer consisting of acryloylmorpholine of formula (1).

10. Ink according to claim 1, wherein said water-soluble polymer is obtained by polymerizing a monomer consisting of styrene sulfonate of formula (2).

11. Ink according to claim 1, wherein said water-soluble polymer is obtained by polymerizing monomers consisting of acryloylmorpholine of formula (1) and styrene sulfonate of formula (2).

12. Ink according to claim 1, wherein said water-soluble polymer is obtained by copolymerizing a monomer consisting of acryloylmorpholine of formula (1) and a monomer selected from the group consisting of a lower fatty acid vinyl ester of formula (3) and styrene.

13. Ink according to claim 1, wherein said water-soluble polymer is obtained by copolymerizing a monomer consisting of styrene sulfonate of formula (2) and a monomer selected from the group consisting of a lower fatty acid vinyl ester of formula (3) and styrene.

14. Ink according to claim 2, wherein n is an integer of 0 to 3.

15. Ink according to claim 4, wherein said polymerization degree is 20 to 70.

16. Ink according to claim 1, wherein said ink consists essentially of an aqueous medium, a water-insoluble colorant including a pigment and optionally a water-insoluble dye, and a dispersant for dispersing said colorant in said aqueous medium, said dispersant being a water-soluble polymer obtained by polymerizing a monomer containing at least one monomer selected from acryloylmorpholine of formula (1):

$$O \diagup\diagdown N-\underset{\underset{O}{\|}}{C}-CH=CH_2 \tag{1}$$

and styrene sulfonate of formula (2):

$$\underset{SO_3M}{\underset{\bigcirc}{CH=CH_2}} \tag{2}$$

wherein M is an alkaline metal atom or an amino group;

or wherein said water-soluble polymer is a copolymer obtained by copolymerizing at least one monomer selected from acryloylmorpholine of formula (1) and styrene sulfonate of formula (2) with at least one monomer selected from a lower fatty acid vinyl ester of formula (3):

$$CH_3-\underset{R^2}{\overset{R^1}{\underset{|}{C}}}-(CH_2)_n-\underset{\underset{O}{\|}}{C}-O-CH=CH_2 \tag{3}$$

wherein n is an integer of 0 to 15, and $R^1$ and $R^2$ are the same or different and indicate a hydrogen atom or a methyl group, and styrene.

* * * * *